Patented Feb. 5, 1946

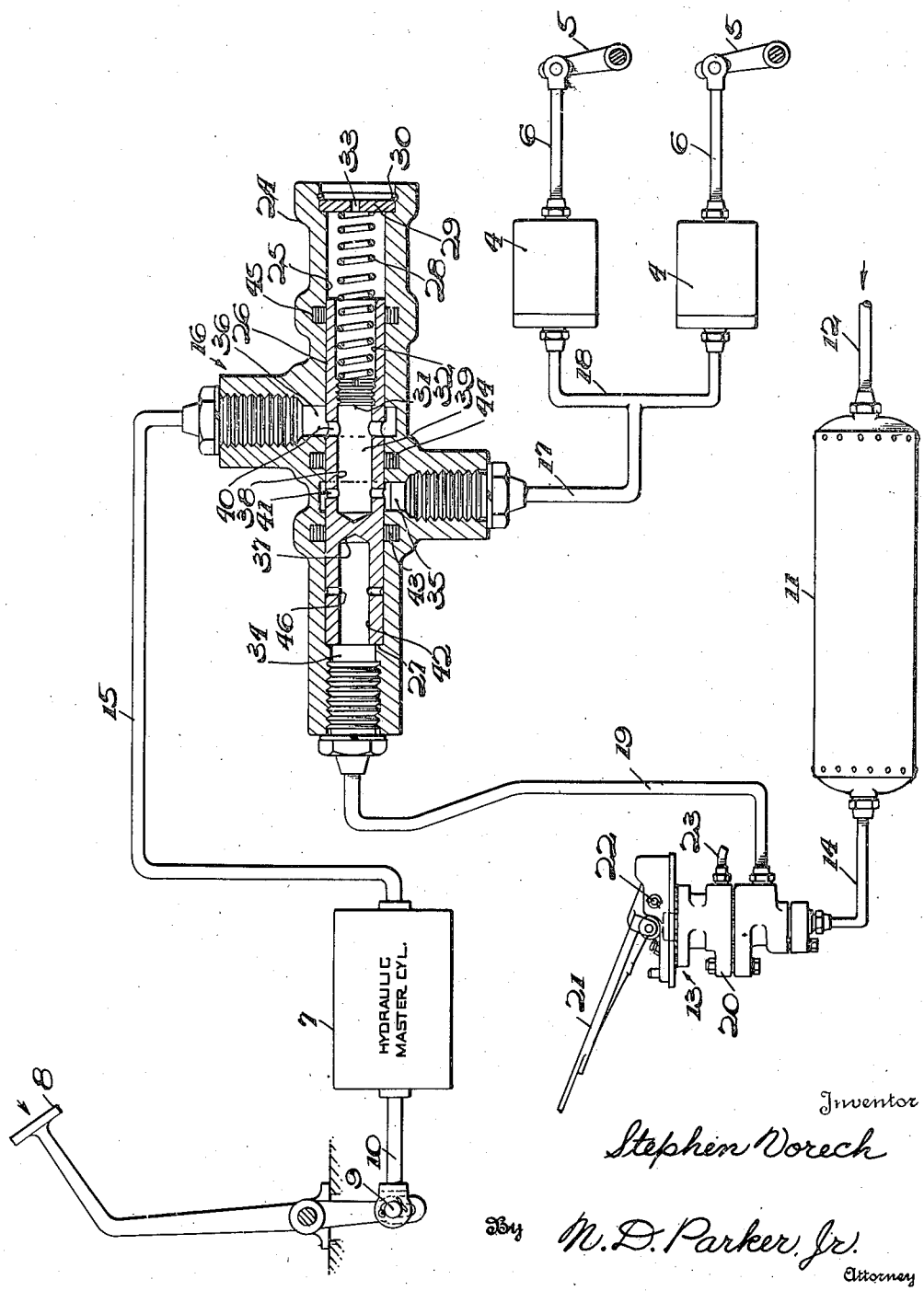

2,394,343

UNITED STATES PATENT OFFICE 2,394,343

FLUID PRESSURE CONTROL MECHANISM

Stephen Vorech, Elyria, Ohio, assignor to Bendix-Westinghouse Automotive Air Brake Company, Elyria, Ohio, a corporation of Delaware Application August 23, 1943, Serial No. 499,679

7 Claims. (Cl. 188—152)

This invention relates primarily to fluid pressure control mechanism, and more particularly to fluid pressure control mechanism for the brakes of an airplane.

It has previously been proposed to provide, in connection with an airplane equipped with hydraulic brakes of more or less conventional type, a separate or auxiliary fluid pressure supply such as compressed air for operating the brakes in the event of failure of the regular hydraulic system, this emergency fluid pressure supply being controlled by means of a valve located adjacent the operator. In addition to the foregoing, and in view of the necessity of preventing any leakage of hydraulic fluid from the hydraulic system as well as the necessity of preventing mixing of the fluids in the regular and auxiliary fluid pressure supply system, it has been necessary to provide suitable valve mechanism in order to isolate the hydraulic portion of the system from the balance of the system, and it is accordingly an object of the present invention to provide valve means of this type, more commonly known as a double check valve, which will efficiently prevent leakage of the hydraulic fluid into the auxiliary portion of the system, and at the same time permit efficient and safe operation of the system either from the regular or auxiliary fluid pressure source.

A further object of the invention is to provide a double check valve in a system of the above type, so constituted as to minimize leakage from one portion of the system to another.

A still further object of the invention is to provide, in combination with a system of the above type, a double check valve wherein a single valve element is positively positioned to normally permit communication between the source of hydraulic fluid pressure and the actuator and to prevent communication between the auxiliary source of fluid pressure and the hydraulic system.

Yet another object of the invention is to provide, in a double check valve of the above type, means for insuring against leakage of air into the hydraulic portion of the system.

Still another object of the invention is to provide, in a system of the above type, valvular means which is effective to connect the hydraulic source of fluid pressure with the actuator regardless of the hydraulic pressure, and which is responsive only to the pressure supplied to the double check valve from the auxiliary fluid pressure source.

A still further object of the invention is to provide, in a fluid pressure control system of the above type, a double check valve for controlling the connections between the separate fluid pressure sources and the actuator, so constituted as to be movable to connect the auxiliary fluid pressure source with the actuator in response to a predetermined increase in the pressure of fluid supplied to the double check valve from the auxiliary source.

These and other objects and novel features of the invention will appear more fully hereinafter from the following description when taken in connection with the accompanying drawing. It is to be expressly understood, however, that the drawing is employed for purposes of illustration only and is not designed as a definition of the limits of the invention, reference being had for this purpose to the appended claims.

In the drawing, the invention is illustrated in connection with a brake system for an airplane, not shown, wherein a pair of brake actuators or cylinders 4 are connected to brake levers 5 through the medium of piston rods 6, and adapted to be supplied with fluid pressure from a hydraulic master cylinder 7, of conventional type, the piston of the master cylinder being actuated by means of a brake pedal 8 having a pivotal connection 9 with a piston rod 10 of the master cylinder. An auxiliary source of fluid pressure is also provided which includes a reservoir 11 supplied with fluid pressure from a compressor, not shown, through a conduit 12, the flow of fluid pressure from the reservoir being controlled by means of a control valve 13 connected thereto by means of a conduit 14. The master cylinder is connected with the actuators through a conduit 15, a double check valve 16, to be described hereinafter, a conduit 17 and a conduit 18, while the control valve 13 is connected with the brake actuators through a conduit 19, the valve 16, and conduits 17 and 18. The control valve 13 is of well-known construction and may preferably be constructed in accordance with the principles set forth in the patent to William J. Andres and Roy S. Sanford, No. 2,133,275, dated October 18, 1938. This valve is provided with a casing 20 having a pedal 21 pivotally mounted thereon by means of a pivot pin 22, and is furthermore provided with an exhaust conduit 23, and it will be understood, on reference to the above patent, that the valve is of the so-called self-lapping type, and that with the control pedal in the position shown, the valve mechanism serves to prevent communication between conduits 14 and 19 and to permit communication between conduits 19 and 23, while on depression of the pedal, the valve mechanism serves to prevent communication between conduits 19 and 23 and to permit communication between conduits 14 and 19 to establish a pressure in the latter conduit substantially proportional to the degree of movement of the control pedal. Thus, in the embodiment shown, power operation is available under the control of the valve 13, while manual operation of the brakes is available on operation of the brake pedal 8.

In connection with previous installations of this type, it has been proposed that the auxiliary fluid pressure supply comprise a reservoir or bottle of compressed gas such as air, and it is accordingly necessary to provide interconnecting means for the conduits 15, 17 and 19, so constituted as to prevent any leakage whatsoever between conduits 15 and 17 and the conduit 19 during normal manual operation of the brakes by means of the hydraulic system, as it is well-known that the reserve capacity of the conventional hydraulic system is such that leakage of any appreciable amount of fluid therefrom will decrease the efficiency of the system, while the entrance of air or other gas into the hydraulic portion of the system will likewise decrease its efficiency and result in a so-called soft or spongy pedal. Since it may be possible under certain conditions, particularly under conditions of extreme temperature variation, for a partial vacuum to be developed in the conduit 15 on a sudden release of the brake pedal 8, it will be understood that any means used to isolate one portion of the system from the other should be so constituted as to prevent the entrance of air or gas into the hydraulic portion of the system under the above type of operation, and the double check valve 16 is accordingly so constructed as to overcome these difficulties.

As illustrated in the drawing, the double check valve is provided with a body portion or casing 24, the casing being provided with a longitudinal bore 25 having a valve element 26 slidably mounted therein. A shoulder 27 is provided at the left end of the bore as shown, and the valve element is normally maintained in abutment with this shoulder by means of a suitable spring 28 interposed between a plate 29 retained at the right end of the bore by means of a retaining spring 30 and a suitable plug 31 which is threadedly received in a bore 32 formed in the valve element. The right end of the valve element is subjected at all times to atmospheric pressure by means of a vent 33 formed in the plate 29, while a chamber 34 formed in the bore 25 at the left end of the valve element is connected at all times with the conduit 19 leading to the brake valve 13. The left end of the valve element is therefore subjected at all times to the pressure in the conduit 19 and tends to move to the right in the bore 25 whenever the pressure supplied to the chamber 34 is sufficient to overcome the tension of the spring 28. In addition to the inlet chamber 34, the casing 24 is provided with an annular outlet chamber 35 formed in the wall of the bore 25 as shown, together with a second annular inlet chamber 36 formed in the wall of the bore between the chamber 35 and the right end of the casing, the chamber 35 being connected with the conduit 17 and the chamber 36 being connected with the conduit 15. A partition 37 formed in the interior of the valve element defines, in connection with a bore 38 and the plug 31, a transfer chamber 39 which, with the valve element in the position shown, is connected with the chamber 36 by means of ports 40, and with the chamber 35 by means of ports 41, and in view of the fact that the pressure of fluid in the chambers 35 and 36 acts only on the exterior surface of the valve element and in the chamber 39, it will be understood that the valve element is not responsive to the pressures in either of the above chambers, and that it will therefore normally be maintained in the position shown by means of the spring 28 regardless of the degree of pressure existing in the above chambers. The valve element 26 is also provided with a bore 42 formed in the left end thereof and separated from the chamber 39 by means of the partition 37, the left end of the bore being in communication at all times with the inlet chamber 34. Leakage between the various chambers and between the outer surface of the valve element and the surface of the bore 25 is prevented by means of a seal 43 positioned at the left of the chamber 35, a seal 44 positioned between the chamber 35 and the chamber 36, and a seal 45 positioned between the chamber 36 and the right end of the casing, these seals being so located with respect to the ports 40 and 41 in the valve element, that on movement of the latter to the extreme right, the port 41 passes to the right of the seal 44 while the port 40 remains at the left of the seal 45, it thus being apparent that with the valve element being moved to its extreme right position and in abutment with plate 29, no fluid can flow between chambers 36 and 35 except between the outer surface of the valve element and the inner surface of the plate, this leakage being prevented by the seals 44 and 45. In order to provide communication between chambers 34 and 35 on movement of the valve element to its right hand position, a port 46 is provided in the wall of the bore 42 so positioned as to register with the outlet chamber 35 in the valve in the right hand position.

In view of the foregoing explanation of the operation of the double check valve 16, it will be apparent that with the parts in the position shown, operation of the brake pedal 8 will serve to operate the master cylinder 7 to supply fluid under pressure to the chamber 36 of the double check valve through the conduit 15. Since the ports 40 and 41 are respectively in register with chambers 36 and 35, fluid will flow from chamber 36 to the actuators 4 through the port 40, the transfer chamber 39, port 41, the outlet chamber 35 and conduits 17 and 18, while communication between the transfer chamber 39 and the chamber 34 will be prevented by means of the partition 37 and the seal 43. In view of the fact that the valve element is unaffected by the pressures in the chambers 35 and 36, it will be understood that the valve will remain in the position shown under the action of the spring 28 until sufficient pressure is supplied to the chamber 34 to overcome the tension of the spring and move the valve to the right against the plate 29. In the event of failure of the master cylinder 7 or the conduit 15, the operator has only to depress the pedal 21 of the brake valve 13 whereupon the brake valve is effective to dis-establish the connection between the conduits 19 and 23 and to establish a connection between conduits 14 and 19 to supply fluid pressure to the chamber 34 through the conduit 19 at a pressure substantially proportional to the degree of movement of the pedal 21, and when this pressure is sufficient to overcome the biasing action of the spring 28, the valve will be moved to the extreme right regardless of the pressure obtaining in chambers 35 and 36. The port 46 is so positioned as to register with the chamber 35 when the valve element is in the above position, and fluid pressure will accordingly be supplied to the actuator from the reservoir 11 through conduit 14, valve 13, conduit 19, chamber 34, bore 42, port 46, chamber 35 and conduits 17 and 18. On operation of the brake valve to release fluid pressure from the actuators, the valve element will still remain in the above position until such time as the pressure in the chamber 34 becomes sufficiently low to permit the element to be moved to the left by the spring 28, and the degree of pressure trapped in the chamber 35 and in the brake actuators will be determined by the tension of the spring 28 when considered in connection with the area of the left end of the valve element acted on by the fluid pressure in the chamber 34. Since a relatively small force is required to move the valve element, it will be understood that the valve and the spring are so dimensioned as to cause the pressure trapped in the outlet chamber 35, under this type of operation to be negligible. It will also be understood that in the event the pressure of fluid supplied to the actuators by the master cylinder is insufficient to satisfactorily operate the brakes, the operator may, on operation of the brake valve 13, supply fluid pressure to the actuators from the reservoir 11 at any time regardless of the pressure being applied thereto by the operation of the hydraulic portion of the system.

It will be apparent from the foregoing description, when considered in connection with the drawing, that a double check valve has been provided for use in combination with a brake system having two sources of fluid pressure, so constituted as to effectively prevent the flow of fluid from one source to the other, and at the same time to prevent leakage of either fluid from the system. Under certain conditions of operation and particularly during a release of the brakes on the release movement of the brake pedal 8, it is possible for a partial vacuum to be established in the conduit 19 and in the chamber 36, and it will be seen that the valve illustrated and described prevents the entrance of air into the hydraulic system under this condition of operation. While the above double check valve has been illustrated in connection with a system provided with a source of hydraulic fluid pressure and a source of compressed gaseous fluid, it will be understood that the valve mechanism will be equally effective when utilized in connection with a system wherein the fluids supplied from both sources are identical. On the other hand, different liquids may be utilized in the two sources, the valve mechanism being effective to prevent intermixing of the liquids.

While the invention has been illustrated and described herein with considerable particularity, it is to be understood that the same is not limited to the form shown but may receive a variety of mechanical expression which will readily appear to those skilled in the art. Reference will, therefore, be had to the appended claims for a definition of the limits of the invention.

What is claimed is:

1. A double check valve comprising a casing having a bore provided with an outlet port and a pair of inlet ports, a valve element slidably mounted in said bore having means including ports operable in one position of the element to establish communication between the outlet port and one of the inlet ports and operable in another position of the element to establish communication between the outlet port and the other inlet port, means associated with the element for preventing communication between the inlet ports, means for subjecting one end of said element to atmospheric pressure at all times, means for subjecting the other end of the element to the pressure in said other inlet port, and resilient means for normally maintaining said element in said one position.

2. A double check valve comprising a casing having a bore provided with an outlet port, a pair of inlet ports and an atmospheric port, a valve element slidably mounted in said bore having one end subjected to atmospheric pressure and the other end subjected to the pressure of fluid in one of said inlet ports, means including ports in said element operable when the element is in one position to connect the outlet port and the other of said inlet ports and in another position of said element to connect the outlet port and said one inlet port, and resilient means for normally maintaining said element in said one position.

3. A double check valve comprising a casing having a bore provided with an outlet port, an atmospheric port, and a pair of inlet ports, a pressure responsive valve element slidably mounted in said bore subjected at one end to atmospheric pressure and at the other end to the pressure of fluid in one of said inlet ports, a transfer chamber formed in the valve element having ports operable in one position of the element to connect the outlet port with the other of said inlet ports and in another position of the element to prevent communication between said ports, means for normally maintaining said element in said one position, and means for connecting said outlet port and said one inlet port when the element is in said another position including a second transfer chamber formed in the element having a connection at all times with said one port and a port adapted for registration with said outlet port when the valve is in said another position.

4. A double check valve comprising a casing having an inlet chamber, an atmospheric chamber, a bore connecting said chambers, an outlet chamber formed in the wall of said bore between the first named chambers, a second inlet chamber formed in the wall of said bore between the outlet chamber and the atmospheric chamber, a slide valve mounted in said bore having one end subjected to the fluid in the atmospheric chamber and the other end subjected to the fluid in said first named inlet chamber, a transfer chamber and a pair of ports formed in the element for connecting the outlet chamber and the second inlet chamber when the element is in one position, a second transfer chamber and a port formed in the element for connecting the outlet chamber and said first named inlet chamber when the element is in another position, and a spring for normally maintaining said element in said one position.

5. A double check valve comprising a casing having an inlet chamber, an atmospheric chamber, a bore connecting said chambers, an outlet chamber formed in the wall of said bore, a second inlet chamber formed in the wall of said bore between the outlet chamber and the atmospheric chamber, a slide valve mounted in said bore having one end subjected to the fluid in the atmospheric chamber and the other end subjected to the fluid in said first named inlet chamber, means for normally establishing a connection between the outlet chamber and said second inlet chamber including a transfer chamber in the valve element, a pair of ports in said chamber adapted for registry with the outlet chamber and second inlet chamber when the element is in one position, and a spring for normally maintaining the element in said one position, and means for connecting the outlet port and said one inlet port when the element is in another position including a second transfer chamber having a connection with said first named inlet chamber and a port adapted for registry with the outlet chamber when the element is in said another position.

6. The combination in a fluid pressure control system having a fluid actuator, a source of fluid pressure for supplying fluid pressure to the actuator and an auxiliary source of fluid pressure for supplying fluid pressure to the actuator, of means for normally connecting said first named source and actuator regardless of the pressure supplied by the first named source including a double check valve having a pressure responsive valve element movably mounted therein and adapted in one position to connect the first named source and actuator, resilient means for normally maintaining said element in said one position, means including a connection with the auxiliary source for supplying fluid pressure to said double check valve to move the element to another position, and means including a port in said element for establishing a connection between said actuator and connection when the valve element is in said another position.

7. The combination in a fluid pressure control system having a fluid actuator, a source of fluid pressure and an auxiliary source of fluid pressure, of means for controlling the flow of fluid pressure between said sources and actuator including a double check valve having a connection with the actuator, a connection with the first named source, and a connection with the auxiliary source, a valve element movably mounted therein responsive to the pressure of fluid in the connection to the auxiliary source and irresponsive to the pressure in the other connections, ports associated with said element operable in one position thereof for establishing communication between the first and second named connections and operable in another position thereof for establishing communication between said second and third named connections, and means for normally maintaining the element in said one position.

STEPHEN VORECH.